US009626869B2

(12) United States Patent
Ariga et al.

(10) Patent No.: US 9,626,869 B2
(45) Date of Patent: Apr. 18, 2017

(54) DRIVE ASSISTING APPARATUS

(75) Inventors: Takuma Ariga, Susono (JP); Hitoshi Yuasa, Susono (JP)

(73) Assignee: TOYOTA JIDOSHA KABUSHIKI KAISHA, Toyota-shi, Aichi (JP)

( * ) Notice: Subject to any disclaimer, the term of this patent is extended or adjusted under 35 U.S.C. 154(b) by 0 days.

(21) Appl. No.: 13/885,117

(22) PCT Filed: Jan. 20, 2011

(86) PCT No.: PCT/JP2011/050993
§ 371 (c)(1),
(2), (4) Date: May 13, 2013

(87) PCT Pub. No.: WO2012/098667
PCT Pub. Date: Jul. 26, 2012

(65) Prior Publication Data
US 2013/0297172 A1 Nov. 7, 2013

(51) Int. Cl.
*G08G 1/16* (2006.01)
*B60W 30/16* (2012.01)
(52) U.S. Cl.
CPC .......... *G08G 1/166* (2013.01); *B60W 30/16* (2013.01); *B60W 2540/18* (2013.01); *B60W 2550/308* (2013.01); *B60W 2720/106* (2013.01)
(58) Field of Classification Search
CPC ........... B60W 30/16; B60W 2540/18; B60W 2540/20; B60W 2550/30–2550/308; B60W 2750/30–2750/308; B60W 2720/106
USPC .......................................................... 701/70
See application file for complete search history.

(56) References Cited

U.S. PATENT DOCUMENTS

| 5,400,864 A * | 3/1995 | Winner et al. ............... 180/169 |
| 6,061,015 A | 5/2000 | Sugimoto |
| 2004/0193374 A1* | 9/2004 | Hac et al. .................... 701/301 |
| 2006/0009910 A1* | 1/2006 | Ewerhart ............ B60W 30/143 |
| | | 701/301 |
| 2007/0021876 A1* | 1/2007 | Isaji et al. ....................... 701/1 |
| 2007/0106475 A1* | 5/2007 | Kondoh ............... B60K 26/021 |
| | | 701/301 |

(Continued)

FOREIGN PATENT DOCUMENTS

| CN | 1862227 A | 11/2006 |
| JP | 5-24518 A | 2/1993 |
| JP | 06-008747 A | 1/1994 |

(Continued)

OTHER PUBLICATIONS

Seto et al., JP11-028948, Feb. 2, 1999 (Machine Translation).*

*Primary Examiner* — Courtney Heinle
(74) *Attorney, Agent, or Firm* — Sughrue Mion, PLLC

(57) ABSTRACT

Provided is a drive assisting apparatus which assists follow-up travelling to a forward vehicle including an inter-vehicle information acquisition unit 10 that acquires a distance between a host vehicle and a forward vehicle, a deceleration unit 12 that performs a deceleration control based on the inter-vehicle distance, and a steering information acquisition unit 14 that detects steering by a driver, and the deceleration unit 12 stops the deceleration control, when the steering is detected. Therefore, it is possible to appropriately understand the will of a driver and perform a deceleration control based on the will of the driver.

5 Claims, 5 Drawing Sheets

(56) References Cited

U.S. PATENT DOCUMENTS

2011/0196592 A1* 8/2011 Kashi .................... B60W 30/16
  701/96

FOREIGN PATENT DOCUMENTS

| | | |
|---|---|---|
| JP | 11-028948 A | 2/1999 |
| JP | 11-202049 A | 7/1999 |
| JP | 2004-110394 A | 4/2004 |
| JP | 2005-170067 A | 6/2005 |
| JP | 2008-149891 A | 7/2008 |
| JP | 2009-298171 A | 12/2009 |
| JP | 2010-143578 A | 7/2010 |
| JP | 2010-209983 A | 9/2010 |

* cited by examiner

DRIVE ASSISTING APPARATUS

CROSS REFERENCE TO RELATED APPLICATIONS

This application is a National Stage of International Application No. PCT/JP2011/050993 filed Jan. 20, 2011, the contents of all of which are incorporated herein by reference in their entirety.

TECHNICAL FIELD

The present invention relates to a drive assisting apparatus.

BACKGROUND ART

A drive assisting apparatus is known which performs a deceleration control when a vehicle approaches a forward vehicle (for example, Patent Literature 1). When the vehicle travels at a constant speed, if a distance from the forward vehicle to the vehicle is a threshold value or less and an accelerator opening change is not increasing, the apparatus described in Patent Literature 1 performs a deceleration control to suppress a change in an engine speed.

CITATION LIST

Patent Literature

[Patent Literature 1] Japanese Unexamined Patent Application Publication No. 2010-209983

SUMMARY OF INVENTION

Technical Problem

However, a driver may feel cumbersome in using the drive assisting apparatus in the related art. For example, even when the vehicle approaches the forward vehicle in order to pass the forward vehicle, there is a concern that the deceleration control may be performed.

Therefore, the present invention has been made to solve the above technical problem, and an object of the invention is to provide a drive assisting apparatus capable of performing a deceleration control based on the will of the driver.

Solution to Problem

That is, a drive assisting apparatus relating to the present invention is a drive assisting apparatus which assists driving, and includes an inter-vehicle information acquisition unit that acquires a distance between a host vehicle and a forward vehicle; a deceleration unit that performs a deceleration control based on the inter-vehicle distance and a steering detection unit that detects steering by a driver, and the deceleration unit stops the deceleration control, when the steering is detected.

In the drive assisting apparatus relating to the present invention, the deceleration control is performed by the deceleration unit based on the distance between the forward vehicle and the host vehicle, and the deceleration control is stopped when the steering by the driver is detected. In this way, when the driver intends to pass the forward vehicle, the deceleration control is stopped, so that assistance consistent with the intention of the driver may be performed. The deceleration control based on the will of the driver may be performed.

Here, the drive assisting apparatus further includes an operation information acquisition unit that acquires operation information relating to an operation of a direction indicator by the driver, and the deceleration unit may temporarily suppress the deceleration control based on the operation information.

In such a configuration, for example, unnecessary deceleration control may be avoided, when the driver intends to steer, after a constant time has passed after an operation of the direction indicator.

Further, the deceleration unit may temporarily suppress the deceleration control, when the direction indicator is in operation and the steering angle is less than a predetermined threshold value. In such a configuration, the driver may have time to change the operation of the direction indicator or to perform the steering. Accordingly, unnecessary deceleration control may be suppressed.

Further, the deceleration unit may stop the deceleration control, when the steering angle is less than the predetermined threshold value and a vehicle is not present in a passing lane. In such a configuration, it is possible to more accurately estimate whether the driver has an intention to pass the forward vehicle, and stop the deceleration control Furthermore, the deceleration unit may perform the deceleration control as a reference of the vehicle in the passing lane, when the steering angle is the predetermined threshold value or more and there is a vehicle in the passing lane. In such a configuration, it is possible to assist a driving while considering the safety.

Advantageous Effects of Invention

According to a drive assisting apparatus relating to the present invention, it is possible to perform a deceleration control based on the will of the driver.

DESCRIPTION OF EMBODIMENTS

Figure 1:
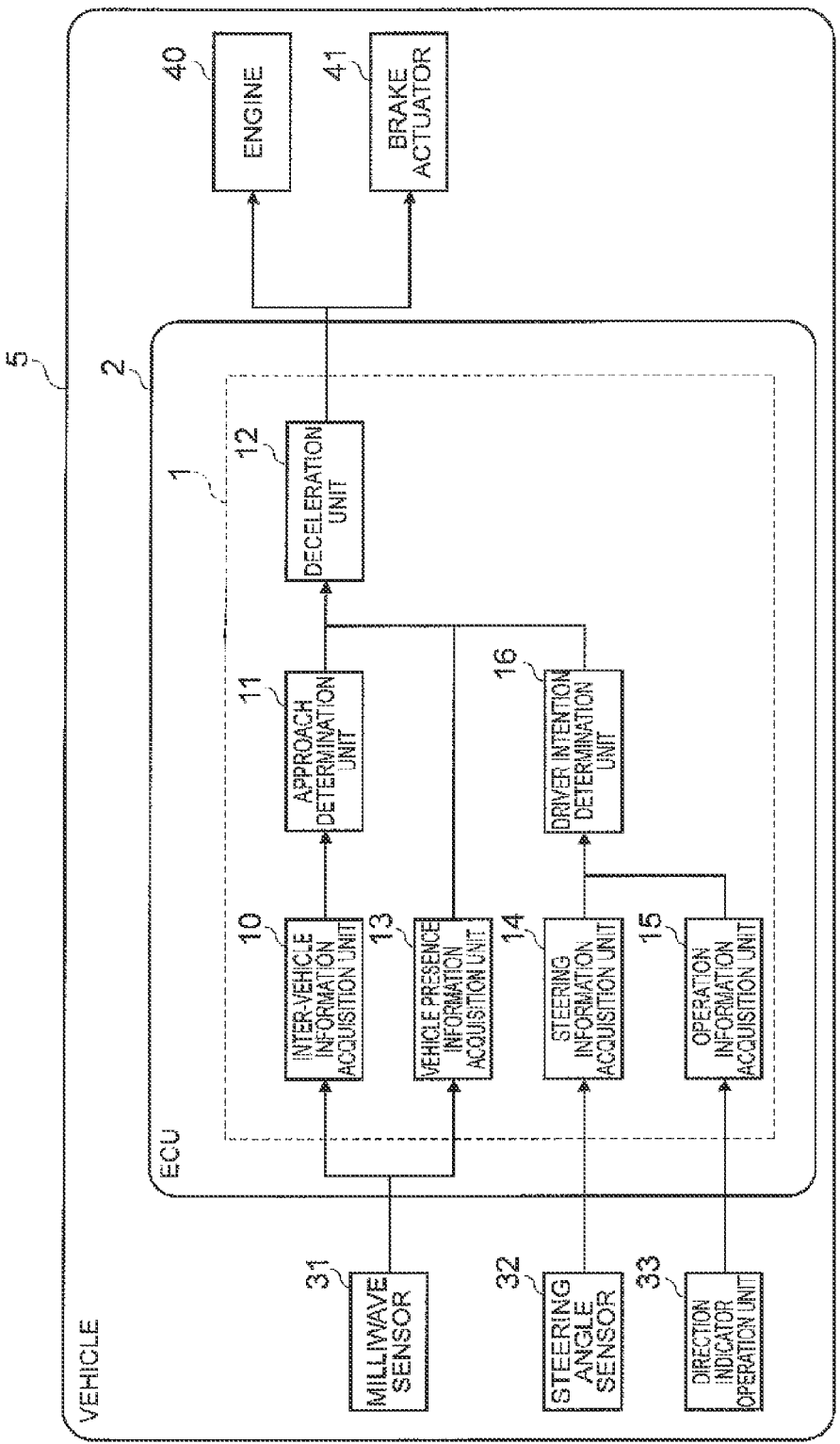
FIG. 1 is a configuration overview of a vehicle having a drive assisting apparatus installed relating to a first embodiment of the present invention.

Hereinafter, embodiments of the present invention will be described referring to the accompanying drawings. Further, in each drawing, the same parts or the equivalent parts are denoted by the same reference numerals, so that the repeated description thereof will be omitted.

First Embodiment

The drive assisting apparatus relating to the present embodiment is an apparatus which controls vehicle travelling, and is appropriately employed in, for example, a vehicle having an automatic driving function such as a follow-up travelling function which ensures a constant inter-vehicle distance, a rear-end collision prevention function which prevents a rear-end collision based on the inter-vehicle distance and a driving lane keeping function, or a vehicle having a driver assisting system installed for improving travelling safety.

First, a description of the configuration of the drive assisting apparatus relating to the embodiment will be made. FIG. 1 is a block diagram illustrating the configuration of the vehicle 5 having the drive assisting apparatus 1 relating to the embodiment. The vehicle 5 shown in FIG. 1 includes a milliwave sensor 31, a steering angle sensor 32, a direction indicator operation unit 33, an ECU 2, an engine 40 and a brake actuator 41. Here, the ECU (Electronic Control Unit) is a computer of a vehicle device which performs an electronic control, and is configured to have a CPU (Central Processing Unit), a ROM (Read Only Memory), a RAM (Random Access Memory), an input/output interface and the like.

The milliwave sensor 31 has a function to detect an object present in the vicinity of the vehicle 5. For example, the milliwave sensor 31 transmits a mill-wave to the vicinity of the vehicle 5 and receives a reflection wave. Consequently, the milliwave sensor 31 detects whether there is an object in the vicinity of the vehicle 5. In addition, the milliwave sensor 31 has a function to acquire information relating to a distance from the vehicle 5 to the detected object and position information of the detected object, based on the transmitted milliwave and the received reflection wave. Further, the milliwave sensor 31 has a function to output the acquired information to the ECU 2.

The steering angle sensor 32 has a function to detect steering of the driver. Further, the steering angle sensor 32 has a function to output the detected information to the ECU 2.

The direction indicator operation unit 33 has a function to receive the operation of the direction indicator by the driver. Further, the direction indicator operation unit 33 has a function to output the received information relating to the operation to the ECU 2.

The ECU 2 includes an inter-vehicle information acquisition unit 10, an approach determination unit 11, a deceleration unit 12, a vehicle presence information acquisition unit 13, a steering information acquisition unit (a steering detection unit) 14, an operation information acquisition unit 15 and a driver intention determination unit 16.

The inter-vehicle information acquisition unit 10 has a function to acquire an inter-vehicle distance between the host vehicle 5 and the preceding vehicle. The inter-vehicle information acquisition unit 10 acquires the inter-vehicle distance, for example, based on information that is output by the milliwave sensor 31. The inter-vehicle information acquisition unit 10 has a function to output the inter-vehicle distance to the approach determination unit 11.

The approach determination unit 11 has a function to determine whether the host vehicle 5 approaches the preceding vehicle based on the inter-vehicle distance information. For example, the approach determination unit 11 determines whether the inter-vehicle distance that is output by the inter-vehicle information acquisition unit 10 is the predetermined threshold value or less. As the threshold value, for example, a distance necessary for a brake control intervention is used. The distance necessary for the brake control intervention is calculated in advance by a simulation, etc. The approach determination unit 11 has a function to output the determination result to the deceleration unit 12.

The vehicle presence information acquisition unit 13 has a function to acquire information as to whether there is a vehicle in the travel lane (passing lane) next to the travel lane in which the host vehicle 5 travels. For example, the vehicle presence information acquisition unit 13 acquires information as to whether there is a vehicle based on the information that is output by the milliwave sensor 31. The vehicle presence information acquisition unit 13 has a function to output the acquired information to the deceleration unit 12.

The steering information acquisition unit 14 has a function to acquire information relating to the steering by the driver. The steering information acquisition unit 14, for example, inputs the information that is output by the steering angle sensor 32 as steering information. The steering information acquisition unit 14 has a function to output the steering information to the driver intention determination unit 16.

The operation information acquisition unit 15 has a function to acquire information relating to the operation of the direction indicator of the driver. The operation information acquisition unit 15, for example, acquires the information that is output by the direction indicator operation unit 33 as operation information. The operation information acquisition unit 15 has a function to output the operation information to the driver intention determination unit 16.

The driver intention determination unit 16 has a function to determine the driver's intention, based on the steering information that is output by the steering information acquisition unit 14 and the operation information that is output by the operation information acquisition unit 15. For example, when the direction indicator is operated, the driver intention determination unit 16 determines that there is a possibility that the driver has an intention to pass the preceding vehicle. When the direction indicator is operated and the steering angle of the threshold value or more is detected, the driver intention determination unit 16 determines that the driver does not falsely operate the direction indicator or the driver does not forget to turn off the direction indicator, but the driver has an intention to pass the preceding vehicle. For example, the threshold value is set in advance by the simulation or the like. The driver intention determination unit 16 has a function to output the determination result to the deceleration unit 12.

The deceleration unit 12 has a function to control an engine 40 or a brake actuator 41 so as to perform a deceleration control. The deceleration unit 12 has a function to cause a brake control to intervene, when the vehicle 5 and the preceding vehicle are close to each other, based on the determination result that is output by the approach determination unit 11. Further, the deceleration unit 12 has a function to cause the brake control to intervene as a reference of the vehicle that travels in the passing lane, when there is a vehicle in the passing lane, based on the information relating to the presence or absence of the vehicle that is output by the vehicle presence information acquisition unit 13. In addition, the deceleration unit 12 has a function not to perform or stop the brake control intervention, when the driver has an intention to pass the preceding vehicle based on the determination result that is output by the driver intention determination unit 16. In addition, the deceleration unit 12 has a function to delay the brake control intervention when there is a possibility that the driver has an intention to pass the preceding vehicle.

The drive assisting apparatus 1 is configured by the inter-vehicle information acquisition unit 10, the approach determination unit 11, the deceleration unit 12, the vehicle presence information acquisition unit 13, the steering information acquisition unit 14, the operation information acquisition unit 15 and the driver intention determination unit 16 that are described above. The drive assisting apparatus 1 may not have the vehicle presence information acquisition unit 13 and the driver intention determination unit 16 depending on the performance requested in the vehicle.

Figure 2:
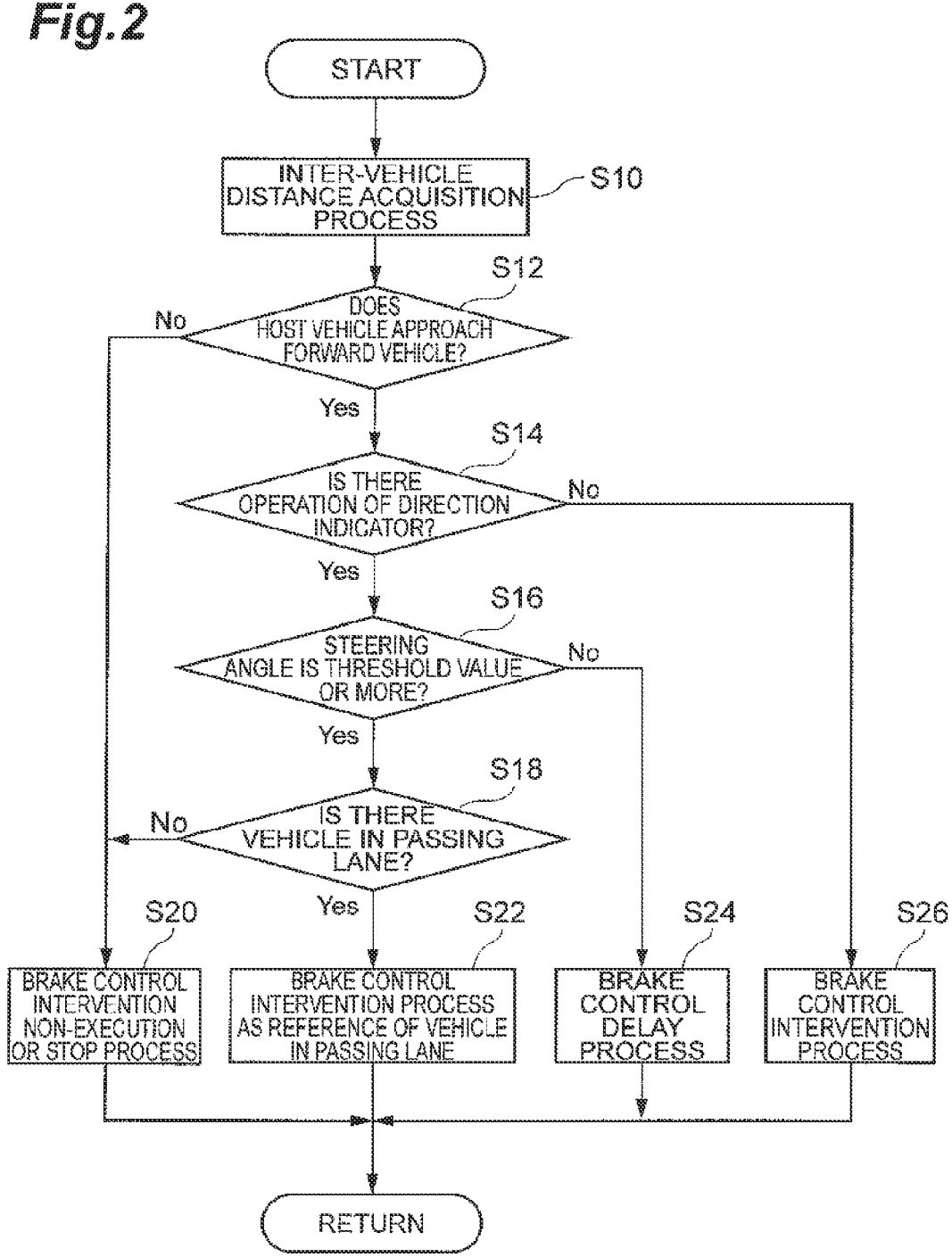
FIG. 2 is a flow chart illustrating an operation of the drive assisting apparatus of FIG. 1.

Next, the description of the operation of the drive assisting apparatus 1 will be made. FIG. 2 is a flowchart illustrating an operation of the drive assisting apparatus 1 relating to the embodiment. For example, the control process shown in FIG. 2 is repeatedly performed at a predetermined interval after an ignition is turned on or the starting button of a travel control equipped in the vehicle 5 is turned on.

As shown in FIG. 2, the drive assisting apparatus 1 starts with the inter-vehicle distance acquisition process (S10). In the process of S10, the inter-vehicle information acquisition unit 10 acquires information relating to the inter-vehicle distance between the host vehicle 5 and the preceding vehicle. If the process of S10 is completed, the process proceeds to the approach determination process (S12).

In the process of S12, the approach determination unit 11 determines whether the host vehicle 5 approaches the preceding vehicle. The approach determination unit 11, for example, determines whether the inter-vehicle distance acquired in the process of S10 is the threshold value or less, that is, the brake control intervention has to be performed. When the approach determination unit 11 determines that the inter-vehicle distance is not the threshold value or less, the brake control intervention is not performed (S20). Then, the drive assisting apparatus 1 terminates the control process shown in FIG. 2.

On the other hand, in the process of S12, when it is determined that the inter-vehicle distance is the threshold value or less, the process proceeds to the operation determination process of the direction indicator (S14). In the process of S14, the driver intention determination unit 16 determines whether there is the operation of the direction indicator, based on information relating to the operation of the direction indicator that is output by the operation information acquisition unit 15. When the direction indicator is not operated, it is possible to regard that the driver does not have an intention to pass the preceding vehicle. Accordingly, the driver intention determination unit 16 process to the brake control intervention process when the direction indicator is not operated (S26). In the process of S26, the deceleration unit 12 causes the brake control to intervene by operating the engine brake or the brake actuator 41 of the engine 40. If the process of S26 is terminated, the drive assisting apparatus 1 terminates the control process shown in FIG. 2.

On the other hand, in the process of S14, when the direction indicator is operated, it is possible to regard that there is a possibility that the driver has an intention to pass the preceding vehicle. Accordingly, the driver intention determination unit 16 process to the steering angle determination process when the direction indicator is operated (S16). In the process of S16, the driver intention determination unit 16 determines whether the steering angle is the predetermined threshold value or more based on information relating to the steering output from the steering information acquisition unit 14. When the steering angle is not the predetermined threshold value or more, it is assumed a case where the direction indicator is falsely operated or a case where the time from the operation of the direction indicator to the operation of the steering is delayed. Accordingly, when the steering angle is not the predetermined threshold value or more, the host vehicle 5 may be in a state where the quick deceleration control is not need. Therefore, the process proceeds to a delay process which causes the timing of the brake control intervention to be delayed (S24).

In the process of S24, the deceleration unit 12 performs the brake control intervention at a timing later than the normal timing. In this manner, the deceleration control is temporarily suppressed and a time interval is set, so that the driver may have time to change the operation of the direction indicator or time to steer (a stand-by state). Accordingly, unnecessary deceleration control may be suppressed. If the process of S24 is terminated, the drive assisting apparatus 1 terminates the control process shown in FIG. 2.

On the other hand, in the process of S16, if the steering angle is the predetermined threshold value or more, it may be determined that the driver has an intention to pass the preceding vehicle. Accordingly, the process proceeds to the process that determines whether there is a vehicle in the passing lane (S18). In the process of S18, the deceleration unit 12 determines whether there is a vehicle in the passing lane, based on the information that is output by the vehicle presence information acquisition unit 13. In the process of S18, when there is a vehicle in the passing lane, the process proceeds to the brake control intervention process (S22).

In the process of S22, in order to ensure safety between the vehicle present in the passing lane and the host vehicle 5, the deceleration unit 12 performs the brake control intervention process as a reference of the vehicle. That is, the deceleration unit 12 has performed the brake control intervention process as a reference of the preceding vehicle up until now, but performs the brake control intervention by changing the vehicle serving as the reference, in order to pass the preceding vehicle by the lane change. If the process of S22 is terminated, the drive assisting apparatus 1 terminates the control process shown in FIG. 2.

On the other hand, in the process of S18, when there is not a vehicle in the passing lane, the process proceeds to the brake control intervention non-execution or stop process (S20).

Heretofore, the control process shown in FIG. 2 has been described. By performing the control process shown in FIG. 2, it is determined whether the driver has an intention of passing, based on the operation information and the steering information of the direction indicator, so that it is possible to avoid the brake control intervention process from being performed when the driver has an intention of passing.

As described above, in the drive assisting apparatus 1 relating to the first embodiment, it is determined whether the driver has an intention of passing, based on the operation information and the steering information of the direction indicator by the driver intention determination unit 16, thereby accurately estimating the intention of the driver. In addition, the deceleration control is performed by the deceleration unit 12 based on the inter-vehicle distance between the forward vehicle and the host vehicle, and thus when the steering by the driver is detected, the deceleration control is stopped. In the apparatus in the related art, when the driver is intending to pass the forward vehicle with approaching the forward vehicle, the deceleration control is also performed, so that the host vehicle performs the lane change in the state where unnecessary control is added. In contrast, in the drive assisting apparatus 1 relating to the first embodiment, even if the driver approaches the forward vehicle, when it is estimated that the driver has an intention of passing, the deceleration control is stopped. Accordingly, it is possible to assist driving, conforming to the intention of the driver.

Therefore, it is possible to perform the deceleration control based on the will of the driver.

Second Embodiment

The drive assisting apparatus 1 relating to the second embodiment has almost the same configuration as the drive assisting apparatus 1 relating to the first embodiment. The drive assisting apparatus 1 relating to the second embodiment is different from the drive assisting apparatus 1 relating to the first embodiment in that the drive assisting apparatus 1 relating to the second embodiment has an acquisition unit that acquires the lane change area information that is information relating to a travel area before the lane change. Further, in the second embodiment, the description of the repeated parts are omitted, and the different parts will be mainly described.

Figure 3:
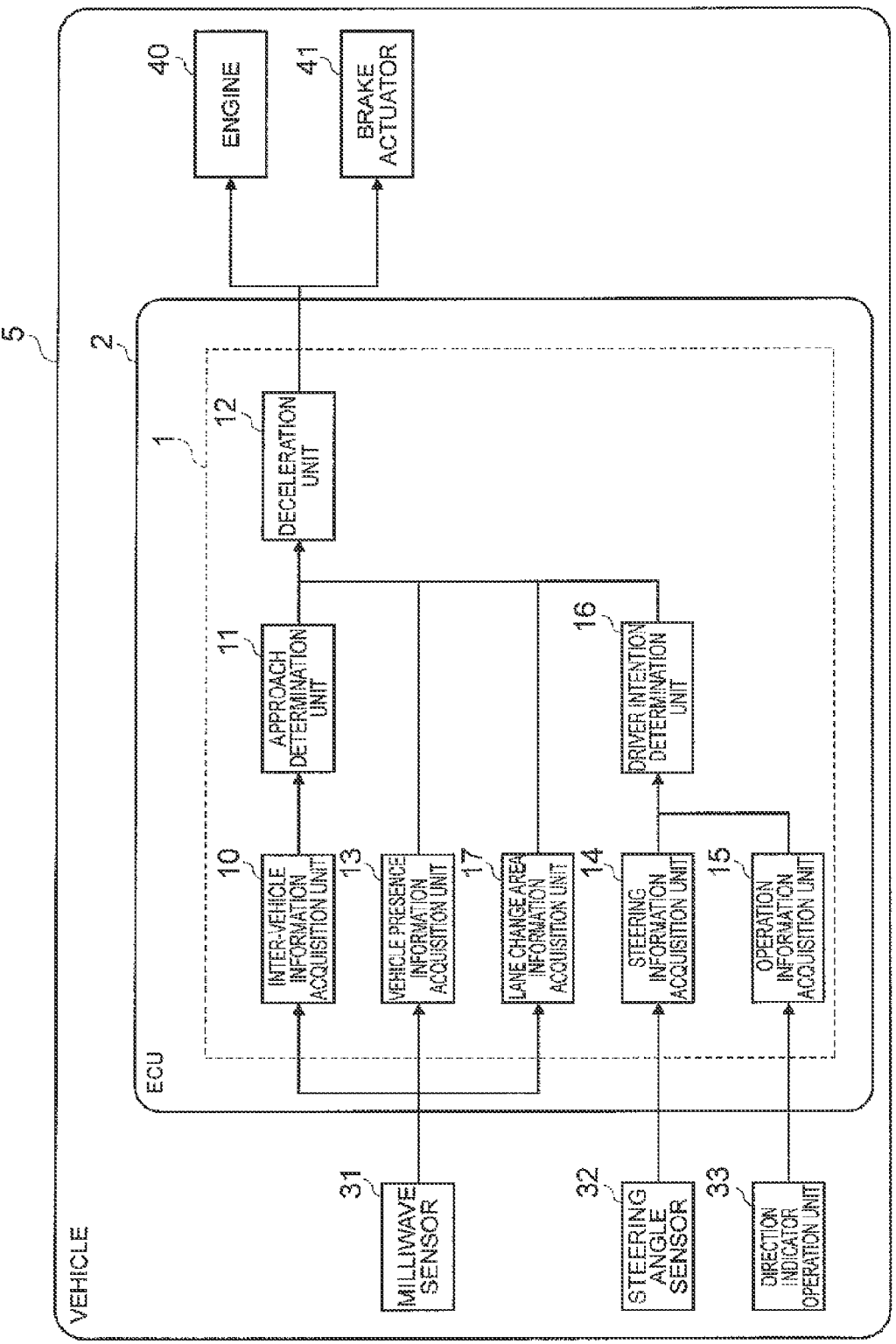
FIG. 3 is a configuration overview of a vehicle having a drive assisting apparatus installed relating to a second embodiment of the present invention.

As shown in FIG. 3, the configuration of the vehicle 5 including the drive assisting apparatus 1 relating to the embodiment is almost the same as the configuration of the vehicle 5 including the drive assisting apparatus 1 relating to the first embodiment. As shown in FIG. 3, the vehicle 5 includes a lane change area information acquisition unit 17. The lane change area information acquisition unit 17 has a function to acquire information showing whether the travel area of the host vehicle is unoccupied before the lane change. For example, the lane change area information acquisition unit 17 determines whether the travel area of the host vehicle is unoccupied before the lane change, based on the forward detection result and the rearward detection result of the milliwave sensor 31. Further, the lane change area information acquisition unit 17 has a function to output the acquired information to the driver intention determination unit 16. The deceleration unit 12 has a function to perform the deceleration control, based on the output result from the lane change area information acquisition unit 17. Other functions of the deceleration unit 12 are the same as the functions described in the first embodiment.

Figure 4:
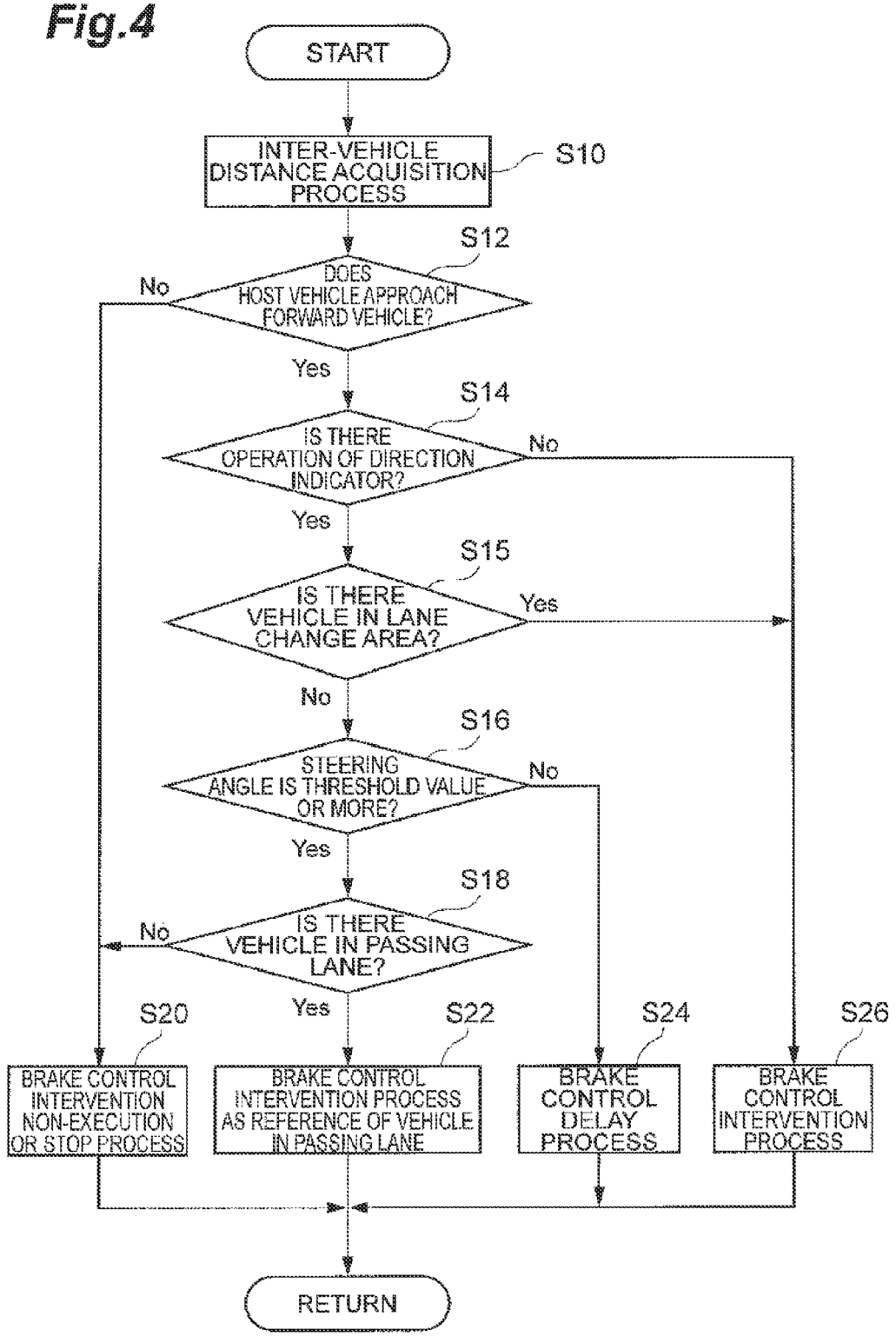
FIG. 4 is a flow chart illustrating an operation of the drive assisting apparatus of FIG. 3.

Next, the description of the operation of the aforementioned drive assisting apparatus 1 will be made. FIG. 4 is a flow chart illustrating the operation of the drive assisting apparatus 1 relating to the embodiment. The control process shown in FIG. 4, for example, is repeatedly performed at a predetermined interval after an ignition or the starting point of a travel control equipped in the vehicle 5 is turned on. Since the operation of the drive assisting apparatus 1 relating to the second embodiment is almost the same as the operation of the drive assisting apparatus 1 relating to the first embodiment, only different points will be described.

Figure 5:
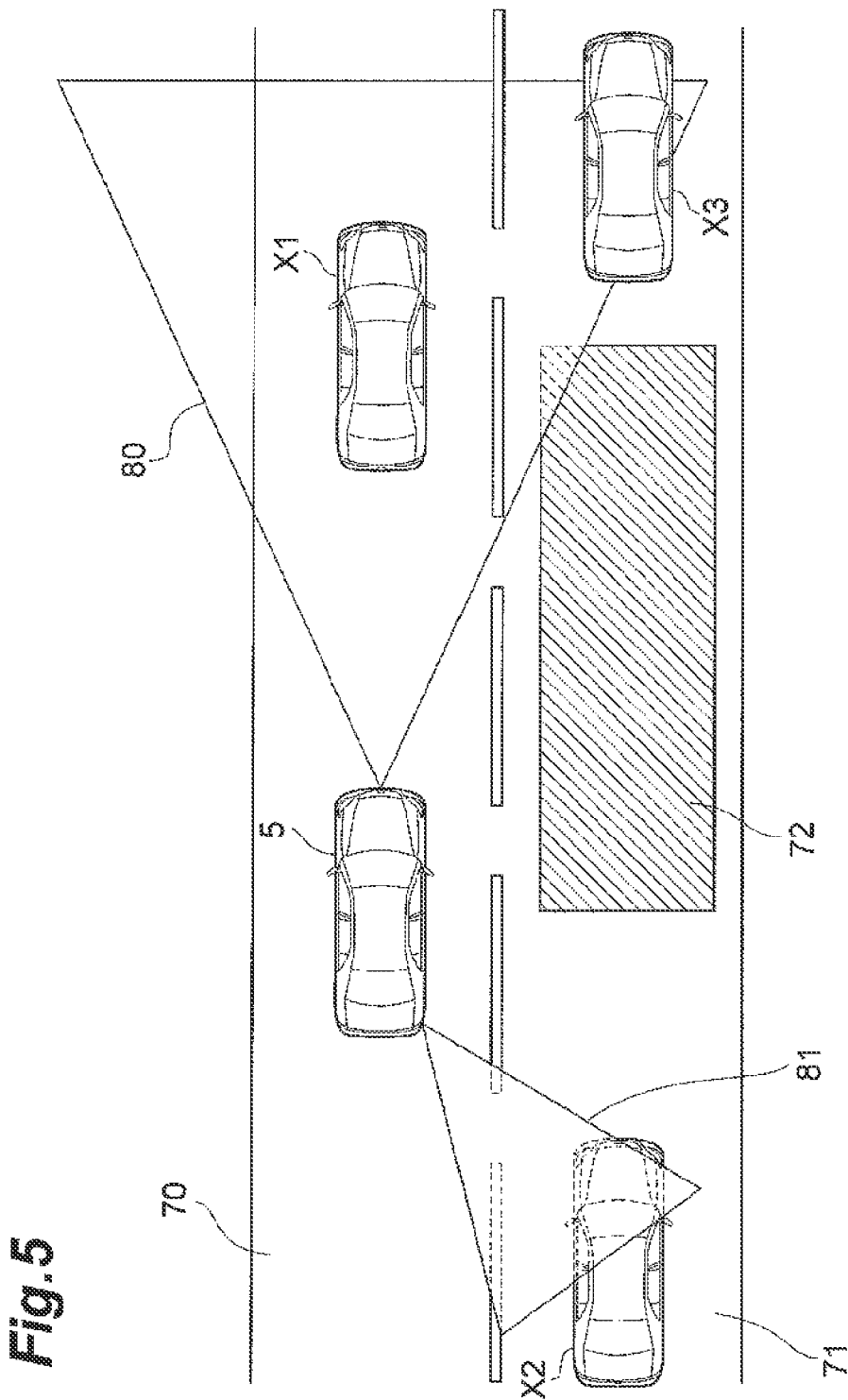
FIG. 5 is an overview illustrating an operation of the drive assisting apparatus of FIG. 3.

As shown in FIG. 4, in the operation determination process of the direction indicator of S14, when the drive assisting apparatus 1 determines that the direction indicator is in operation, the process proceeds to the vehicle presence determination process (S15). In the process of S15, the lane change area information acquisition unit 17 determines whether the travel area of the host vehicle is unoccupied before the lane change, based on the forward detection result and the rearward detection result of the milliwave sensor 31. Hereinafter, a detailed description will be made using FIG. 5. FIG. 5 is an overview illustrating the details of the vehicle presence determination process. FIG. 5 shows a two-lane road on one side with travel lanes 70, 71. In the travel lane 70, the host vehicle 5 travels following the preceding vehicle X1. As a reference of the host vehicle 5, the travel lane 71 is the passing lane. In addition, in the travel lane 71, the vehicle X3 is present in front of the host vehicle 5 and the vehicle X2 is present at the rear of the host vehicle 5. The milliwave sensor 31 equipped in the host vehicle 5 has a forward milliwave sensor that is disposed in front of the vehicle 5 and a rearward milliwave sensor that is disposed at the rear of the vehicle 5. The forward sensor transmits a milliwave to the detection range 80 and receives a reflection wave, so that the forward sensor detects the presence or the absence of the vehicle in front of the travel lane 71 and position information thereof. The rearward sensor transmits a milliwave to the detection range 81 and receives a reflection wave, so that the rearward sensor detects the presence or the absence of the vehicle at the rear of the travel lane 71 and position information thereof. The lane change area information acquisition unit 17, based on the detection result of the milliwave sensor 31, determines whether there is a vehicle in the area 72 of the travel lane 71. In addition, the area 72 is a travel area of the host vehicle before the lane changes.

Returning to FIG. 4, in the process of S15, when it is determined that there is a vehicle in the travel area of the host vehicle before the lane change, there is high possibility that the driver falsely operates the direction indicator or forgets to turn off the direction indicator, thus the lane change is hardly performed. Accordingly, the process proceeds to the brake control intervention process (S26). On the other hand, in the process of S15, when it is determined that there is not a vehicle in the travel area of the host vehicle before the lane change, it is determined that the vehicle is in the state where the lane change may be performed, so that the process proceeds to the steering angle determination process (S16). Other operations are the same as the control process shown in FIG. 2.

Heretofore, the control process shown in FIG. 4 has been terminated. By performing the control process shown in FIG. 4, it is determined whether the driver has an intention of passing, based on the operation information and the steering information of the direction indicator, so that it is possible to avoid the brake control intervention process from being performed when the driver has an intention of passing. Further, it is possible to perform the deceleration control by determining whether the operation of the direction indicator by the driver is intended, based on the vehicle presence information of the passing lane.

As described above, in the drive assisting apparatus 1 relating to the second embodiment, it is determined whether the driver has an intention of passing, based on the operation information and the steering information of the direction indicator by the driver intention determination unit 16, thereby accurately estimating the intention of the driver. In addition, based on the vehicle presence information in the passing lane, it is possible to perform the deceleration control by determining whether the operation of the direction indicator by driver is not intended. In addition, the deceleration control is performed by the deceleration unit 12 based on the inter-vehicle distance between the forward vehicle and the host vehicle, and thus when the steering by the driver is detected, the deceleration control is stopped. In the apparatus in the related art, when the driver is intending to pass the forward vehicle with approaching the forward vehicle, the deceleration control is also performed, so that the host vehicle performs the lane change in the state where unnecessary control is added. In contrast, in the drive assisting apparatus 1 relating to the second embodiment, even if the driver approaches the forward vehicle, when it is estimated that the driver has an intention of passing, the deceleration control is stopped, so that it is possible to assist driving, conforming to the intention of the driver. Therefore, it is possible to perform the deceleration control based on the will of the driver.

In addition, each of the above described embodiments is to show an example of the drive assisting apparatus relating to the present invention. The drive assisting apparatus relating to the present invention is not limited to the drive assisting apparatus relating to each embodiment, but the drive assisting apparatus relating to each embodiment may be modified and applied to others without departing from the spirit of the inventions described in each claim.

For example, in each embodiment described above, after the operation determination process of the direction indicator (S14), the steering angle determination process (S16) is performed, but after the steering angle determination process is performed, the operation determination process of the direction indicator may be performed.

Further, in each embodiment described above, it is described the case where the drive assisting apparatus 1 is applied to the apparatus that supports the follow-up travelling while ensuring a constant inter-vehicle distance between the forward vehicle and the host vehicle, but without being limited thereto, for example, the drive assisting apparatus 1 may be applied to the apparatus having a rear-end collision prevention function which performs the brake control when the distance between the forward vehicle and the host vehicle becomes short, based on the distance between the forward vehicle and the host vehicle.

REFERENCE SIGNS LIST

1 . . . Drive Assisting Apparatus, 2 . . . ECU, 5 . . . Vehicle, 10 . . . Inter-Vehicle Information Acquisition Unit, 11 . . . Approach Determination Unit, 12 . . . Deceleration Unit, 13 . . . Vehicle Presence Information Acquisition Unit, 14 . . . Steering Information Acquisition Unit (Steering Detection Unit), 15 . . . Operation Information Acquisition Unit, 16 . . . Driver Intention Determination Unit, 17 . . . Lane Change Area Information Acquisition Unit

The invention claimed is:

1. A drive assisting apparatus which assists drive comprising:
  a sensor that detects an object present in a vicinity of a host vehicle;
  an inter-vehicle information acquisition unit that acquires a first inter-vehicle distance between the host vehicle and a forward vehicle preceding the host vehicle in a travel lane in which the host vehicle travels;
  a steering angle detection unit that detects a steering angle;
  an operation information acquisition unit that acquires operation information relating to an operation of a direction indicator by a driver;
  a driver intention determination unit that determines whether the direction indicator is operated, based on the operation information relating to the operation of the direction indicator that is acquired by the operation information acquisition unit, and that determines whether the steering angle detected by the steering angle detection unit is equal to a predetermined threshold value or more;
  a vehicle presence information acquisition unit that acquires information as to whether a vehicle is present in a passing lane next to the travel lane based on an output of the sensor; and
  a deceleration unit that performs a deceleration control based on a determination of the driver intention determination unit and an output of the vehicle presence information acquisition unit,
  wherein the deceleration unit performs the deceleration control on the basis of the first inter-vehicle distance acquired from the inter-vehicle information acquisition unit if the driver intention determination unit determines that the direction indicator is not operated,
  the deceleration unit suppresses the deceleration control on the basis of the first inter-vehicle distance acquired from the inter-vehicle information acquisition unit, if the driver intention determination unit determines that the direction indicator is operated and the driver intention determination unit determines that the steering angle is not equal to the predetermined threshold value or more, until: (i) the driver intention determination unit determines that the direction indicator is not operated after determining that the direction indicator is operated, or (ii) the driver intention determination unit determines that the steering angle is equal to the predetermined threshold value or more after determining that the steering angle is not equal to the predetermined threshold value or more, and
  the deceleration unit stops the deceleration control if the driver intention determination unit determines that the direction indicator is operated, the driver intention determination unit determines that the steering angle is equal to the predetermined threshold value or more, and the vehicle presence information acquisition unit acquires information that a vehicle is not present in the passing lane based on the output of the sensor.

2. The drive assisting apparatus according to claim 1,
  the inter-vehicle information acquisition unit further acquires a second inter-vehicle distance between the host vehicle and the forward vehicle in the passing lane;
  wherein the deceleration unit performs the deceleration control on the basis of the second inter-vehicle distance acquired from the inter-vehicle information acquisition unit, if the driver intention determination unit determines that the direction indicator is operated and the driver intention determination unit determines that the steering angle is equal to the predetermined threshold value or more, and the vehicle presence information acquisition unit acquires information that a vehicle is present in the passing lane based on the output of the sensor.

3. The drive assisting apparatus according to claim 1,
  wherein the deceleration unit suppresses the deceleration control by performing the deceleration control at a timing later than a normal timing, if the driver intention determination unit determines that the direction indicator is operated and the driver intention determination unit determines that the steering angle is not equal to the predetermined threshold value or more,
  the normal timing is a timing at which the deceleration unit that performs the deceleration control if the first inter-vehicle distance acquired from the inter-vehicle information acquisition unit is equal to a predetermined distance threshold value or less and the driver intention determination unit determines that the direction indicator is not operated.

4. The drive assisting apparatus according to claim 2,
  wherein the deceleration unit suppresses the deceleration control by performing the deceleration control at a timing later than a normal timing, if the driver intention determination unit determines that the direction indicator is operated and the driver intention determination unit determines that the steering angle is not equal to the predetermined threshold value or more, the normal timing is a timing at which the deceleration unit that performs the deceleration control if the first inter-vehicle distance acquired from the inter-vehicle information acquisition unit is equal to a predetermined distance threshold value or less and the driver intention determination unit determines that the direction indicator is not operated.

5. The drive assisting apparatus according to claim 1, a lane change area information acquisition unit that acquires information showing whether a travel area of the host vehicle is unoccupied before a lane change;

wherein the deceleration unit performs the deceleration control on the basis of the first inter-vehicle distance acquired from the inter-vehicle information acquisition unit if the driver intention determination unit determines that the direction indicator is not operated, wherein the deceleration unit performs the deceleration control on the basis of the first inter-vehicle distance acquired from the inter-vehicle information acquisition unit if the driver intention determination unit determines that the direction indicator is operated and the lane change area information acquisition unit acquires information showing the travel area of the host vehicle is not unoccupied before a lane change, the deceleration unit suppresses the deceleration control on the basis of the first inter-vehicle distance acquired from the inter-vehicle information acquisition unit, if the driver intention determination unit determines that the direction indicator is operated, the lane change area information acquisition unit acquires information showing the travel area of the host vehicle is unoccupied before a lane change, and the driver intention determination unit determines that the steering angle is not equal to the predetermined threshold value or more, until: (i) the driver intention determination unit determines that the direction indicator is not operated after determining that the direction indicator is operated, or (ii) the driver intention determination unit determines that the steering angle is equal to the predetermined threshold value or more after determining that the steering angle is not equal to the predetermined threshold value or more, and the deceleration unit stops the deceleration control if the driver intention determination unit determines that the direction indicator is operated, the lane change area information acquisition unit acquires information showing the travel area of the host vehicle is unoccupied before a lane change, and the driver intention determination unit determines that the steering angle is equal to the predetermined threshold value or more.

* * * * *